(12) United States Patent
Liang

(10) Patent No.: US 9,122,498 B2
(45) Date of Patent: Sep. 1, 2015

(54) FIRMWARE CODE LOADING METHOD, MEMORY CONTROLLER AND MEMORY STORAGE APPARATUS

(71) Applicant: PHISON ELECTRONICS CORP., Miaoli (TW)

(72) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 298 days.

(21) Appl. No.: 13/925,816

(22) Filed: Jun. 24, 2013

(65) Prior Publication Data
US 2014/0331033 A1 Nov. 6, 2014

(30) Foreign Application Priority Data

May 6, 2013 (TW) .............................. 102116111 A

(51) Int. Cl.
*G06F 12/00* (2006.01)
*G06F 9/445* (2006.01)
*G06F 3/06* (2006.01)

(52) U.S. Cl.
CPC .............. *G06F 9/445* (2013.01); *G06F 3/0656* (2013.01); *G06F 12/00* (2013.01)

(58) Field of Classification Search
CPC ........ G06F 3/0656; G06F 9/445; G06F 12/00
See application file for complete search history.

(56) References Cited

U.S. PATENT DOCUMENTS

| 8,838,949 B2* | 9/2014 | Gupta et al. ...................... 713/2 |
| 2011/0072190 A1* | 3/2011 | Borracini et al. ............. 711/103 |
| 2012/0297115 A1* | 11/2012 | Liang ............................ 711/103 |
| 2015/0095551 A1* | 4/2015 | Confalonieri et al. ........ 711/103 |

FOREIGN PATENT DOCUMENTS

| TW | I232406 | 5/2005 |
| TW | 201248404 | 12/2012 |

* cited by examiner

*Primary Examiner* — John Lane
(74) *Attorney, Agent, or Firm* — Jianq Chyun IP Office

(57) ABSTRACT

A firmware code loading method for loading a firmware code from a rewritable non-volatile memory module of a memory storage apparatus is provided. The method includes: obtaining a storage address for storing a first portion firmware code copy corresponding to a first portion of the firmware code in a first memory part; and obtaining a storage address for storing a second portion firmware code copy corresponding to a second portion of the firmware code in a second memory part. The method further includes: using a parallel mode or a interleave mode to load the first portion firmware code copy and the second portion firmware code copy respectively from the first memory part and the second memory part into a buffer memory. Accordingly, the method can effectively shorten the time of loading the firmware code.

22 Claims, 13 Drawing Sheets

304(N+1)

| Segment copy 1A |
| Segment copy 2A |
| Segment copy 3A |
| Segment copy 4A |
| Segment copy 5A |
| Segment copy 6A |
| |
| ⋮ |
| |

210

| Segment copy 1A |
| Segment copy 2B |
| Segment copy 3A |
| Segment copy 4B |
| Segment copy 5A |
| Segment copy 6B |
| |
| ⋮ |
| |

306(N+1)

| Segment copy 1B |
| Segment copy 2B |
| Segment copy 3B |
| Segment copy 4B |
| Segment copy 5B |
| Segment copy 6B |
| |
| ⋮ |
| |

FIG. 9

FIRMWARE CODE LOADING METHOD, MEMORY CONTROLLER AND MEMORY STORAGE APPARATUS

CROSS-REFERENCE TO RELATED APPLICATION

This application claims the priority benefit of Taiwan application Ser. No. 102116111, filed on May 6, 2013. The entirety of the above-mentioned patent application is hereby incorporated by reference herein and made a part of this specification.

BACKGROUND

1. Technology Field

The present invention relates to a firmware code loading method, and a memory controller and a memory storage apparatus using the method.

2. Description of Related Art

The growth of digital cameras, mobile phones, and MP3 players has been rapid in recent years. Consequently, the consumers' demand for storage media has increased tremendously. Rewritable non-volatile memory is one of the most adaptable memories for portable electronic products such as cellular phone, personal digital assistant and laptop computer due to its data non-volatility, low power consumption, small volume, non-mechanical structure and high read/write speed. For these reasons, flash memory has become an import part of the electronic industries.

Conventionally, a firmware code of a flash memory controller of a flash memory storage apparatus is stored in a programmable read only memory of the flash memory controller (which generally cannot be changed), and executed after being loaded into a static random access memory (SRAM) of the flash memory controller when the flash memory controller operates. However, based on increasingly growth in size, complicity and revision speed of the firmware code, it is required that the firmware code can be updated/modified accordingly. To reduce the size of the storage apparatus and have the firmware code updated/modified easily, in current technology, it has been designed to directly store the firmware code into the flash memory module of the memory storage apparatus, and the firmware code is loaded into the static random access memory (SRAM) of the flash memory controller when the flash memory controller is turned on. Accordingly, the size of the storage apparatus can be effectively reduced and its manufacturing costs may also be effectively lowered without additionally configuring the programmable read only memory.

However, reading the firmware code from the flash memory module may result in an extension of time required for initialization of the flash memory storage apparatus after being powered on. In particular, in an example when the flash memory storage apparatus is used as a major storage medium of an electronic device (e.g., a computer), a user tends to wish that time required for booting up the electron device is as short as possible. Therefore, a development for a faster firmware code loading method is needed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a firmware code loading method, a memory controller and a memory storage apparatus using the same, which are capable of loading the firmware code quickly to reduce time for activating an electronic device.

The present invention provides a firmware code loading method for loading a firmware code from a rewritable non-volatile memory module of a memory storage apparatus, in which the firmware code operates a memory storage apparatus and at least includes a plurality of segments, the rewritable non-volatile memory module at least includes a first memory part and a second memory part. The firmware code loading method includes: obtaining a storage address for storing a first portion firmware code copy corresponding to a first portion of the segments in a first memory part of the writable non-volatile memory module; and obtaining a storage address for storing a second portion firmware code copy corresponding to a second portion of the segments in a second memory part of the writable non-volatile memory module. The firmware code loading method further includes: using a parallel mode or a interleave mode to load the first portion firmware code copy and the second portion firmware code copy respectively from the first memory part and the second memory part into a buffer memory.

According to an exemplary embodiment of the present invention, a memory controller for loading a firmware code from a rewritable non-volatile memory module of a memory storage apparatus is provided. The memory controller includes a host interface, a memory interface, a buffer memory and a memory management circuit. The host interface is configured to couple to a host system. The memory interface is configured to couple to the rewritable non-volatile memory module, in which the rewritable non-volatile memory module at least includes a first memory part and a second memory part, the firmware code includes a plurality of segments, a first portion firmware code copy corresponding to a first portion of the plurality of segments is stored into the first memory part, and a second portion firmware code copy corresponding to a second portion of the plurality of segments is stored into the second memory part. The memory management circuit is coupled to the host interface, the memory interface and the buffer memory. The memory management circuit is configured to, when the memory storage apparatus is powered on, obtain a storage address of the first portion firmware code copy stored in a first memory part, obtain a storage address of a second portion firmware code copy stored in a second memory part, and use a parallel mode or a interleave mode to load the first portion firmware code copy and the second portion firmware code copy respectively from the first memory part and the second memory part into a buffer memory.

According to an exemplary embodiment of the present invention, a memory storage apparatus including a connector, a rewritable non-volatile memory module and a memory controller is provided. The connector is configured to couple to a host system. The rewritable non-volatile memory module at least includes a first memory part and a second memory part. The memory controller has a buffer memory and is coupled to the connector and the rewritable non-volatile memory. The memory controller is configured to load a firmware code from the rewritable non-volatile memory module into the buffer memory, in which the firmware code includes a plurality of segments, a first portion firmware code copy corresponding to a first portion of the plurality of segments is stored into the first memory part, and a second portion firmware code copy corresponding to a second portion of the plurality of segments is stored into the second memory part. Furthermore, the memory controller is configured to, when the memory storage apparatus is powered on, obtain a storage address of the first portion firmware code copy stored in a first memory part, obtain a storage address of a second portion firmware code copy stored in a second memory part, and use a parallel mode or a interleave mode to load the first portion firmware code copy and the second portion firmware code copy respectively from the first memory part and the second memory part into a buffer memory.

Accordingly, the firmware code loading method and the memory controller and the memory storage apparatus in the exemplary embodiments may effectively enhance the speed of loading the firmware code.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9 is a schematic diagram of loading the firmware code according to the first exemplary embodiment.

DESCRIPTION OF THE EMBODIMENTS

Figure 1:
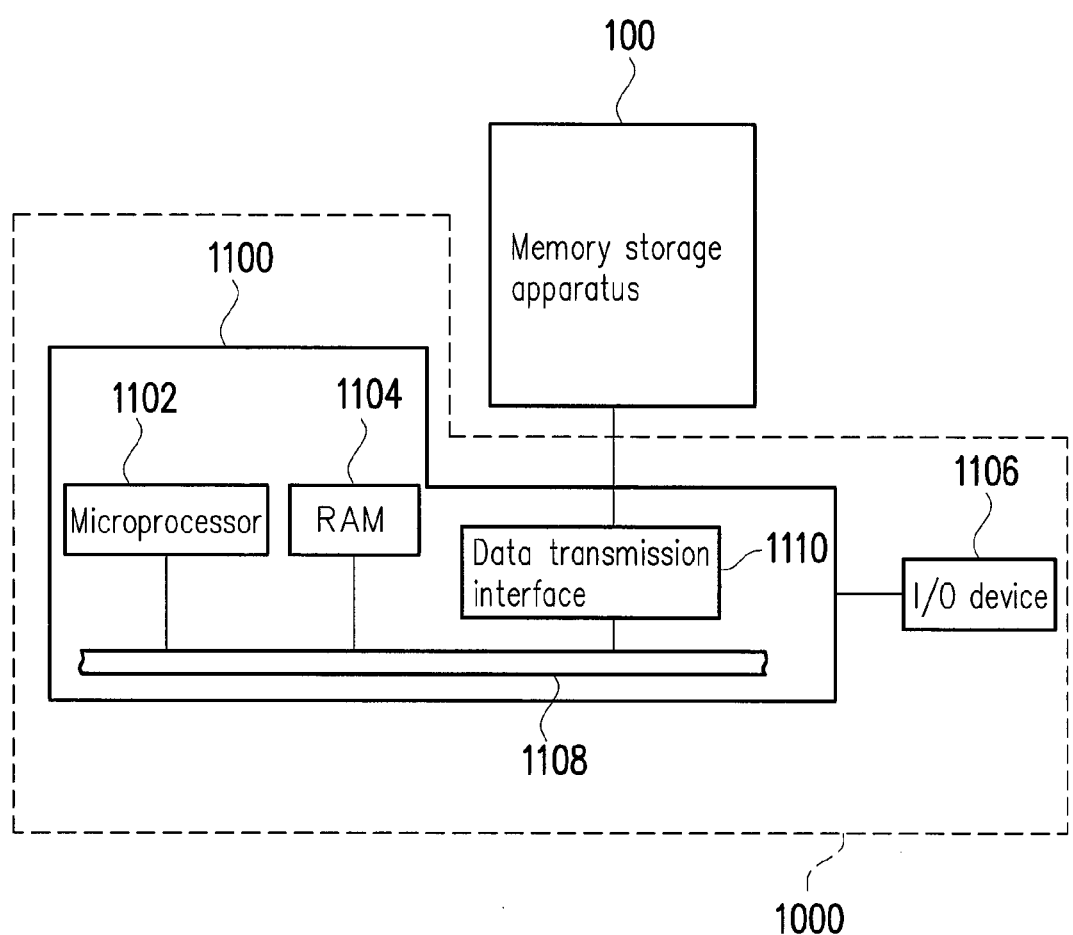
FIG. 1 is a diagram illustrating a host system and a memory storage apparatus according to a first exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

Generally, a memory storage apparatus (also known as a memory storage system) includes a rewritable non-volatile memory module and a controller (also known as a control circuit). The memory storage apparatus is usually configured together with a host system so that the host system may write data to or read data from the memory storage apparatus.

FIG. 1 is a diagram illustrating a host system and a memory storage apparatus according to a first exemplary embodiment.

Figure 2:
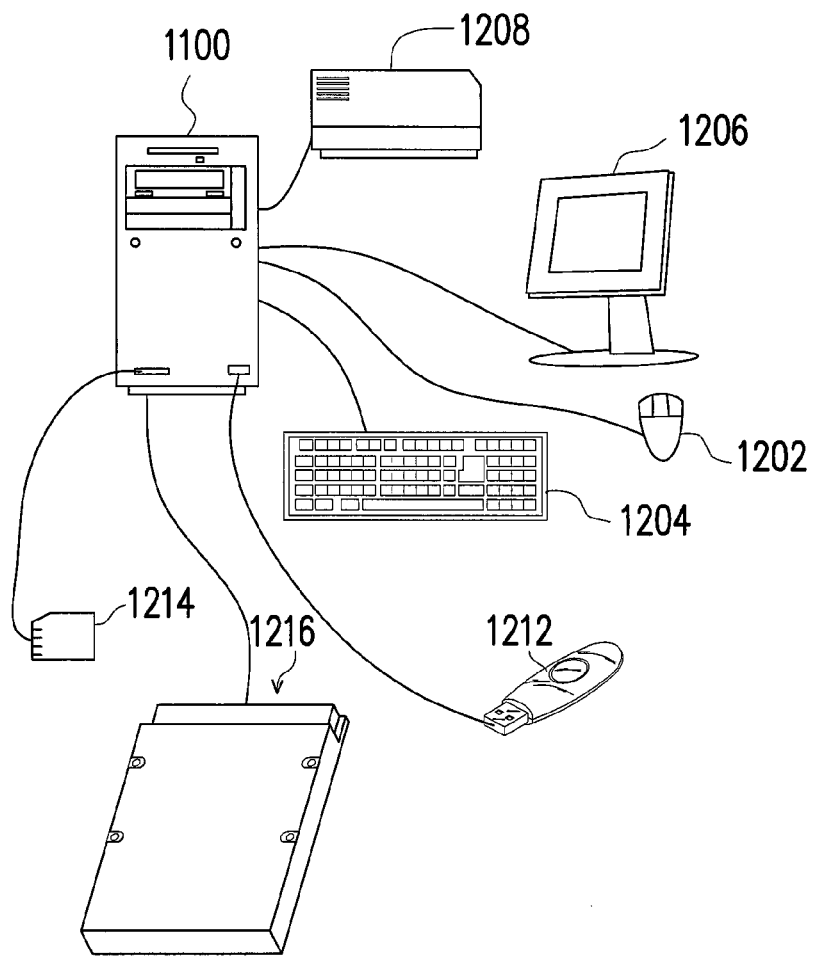
FIG. 2 is a schematic diagram illustrating a computer, an input/output device and a memory storage apparatus according to an exemplary embodiment.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1252 as shown in FIG. 2. It should be understood that the devices illustrated in FIG. 2 are not intended to limit the I/O device 1106, and the I/O device 1106 may further include other devices.

In the embodiment of the invention, the memory storage apparatus 100 is coupled to the devices of the host system 1000 through the data transmission interface 1110. By using the microprocessor 1102, the random access memory (RAM) 1104 and the Input/Output (I/O) device 1106, data may be written to the memory storage apparatus 100 or may be read from the memory storage apparatus 100. For example, the memory storage apparatus 100 may be a rewritable non-volatile memory storage apparatus such as a flash drive 1256, a memory card 1214, or a solid state drive (SSD) 1216 as shown in FIG. 2.

Figure 3:
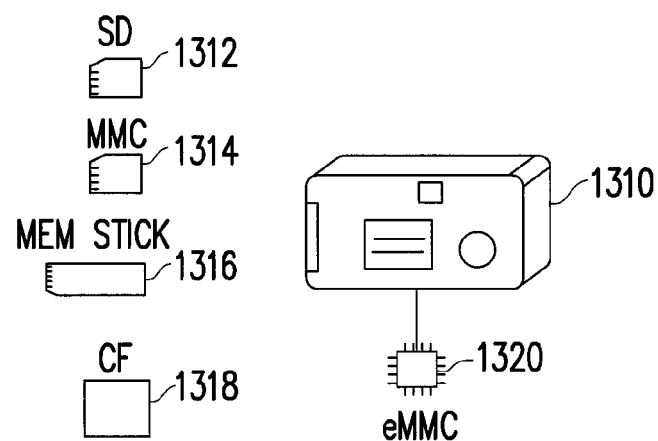
FIG. 3 is a schematic diagram illustrating a host system and a memory storage apparatus according to an exemplary embodiment.

Generally, the host system 1000 may substantially be any system capable of storing data with the memory storage apparatus 100. Although the host system 1000 is described as a computer system in the present exemplary embodiment, in another exemplary embodiment of the present invention, the host system 1000 may be a digital camera, a video camera, a telecommunication device, an audio player, or a video player. For example, if the host system is a digital camera (video camera) 1316, the rewritable non-volatile memory storage apparatus may be a SD card 1312, a MMC card 1314, a memory stick 1316, a CF card 1318 or an embedded storage apparatus 1320 (as shown in FIG. 3). The embedded storage apparatus 1320 includes an embedded MMC (eMMC). It should be mentioned that the eMMC is directly coupled to a substrate of the host system.

Figure 4:
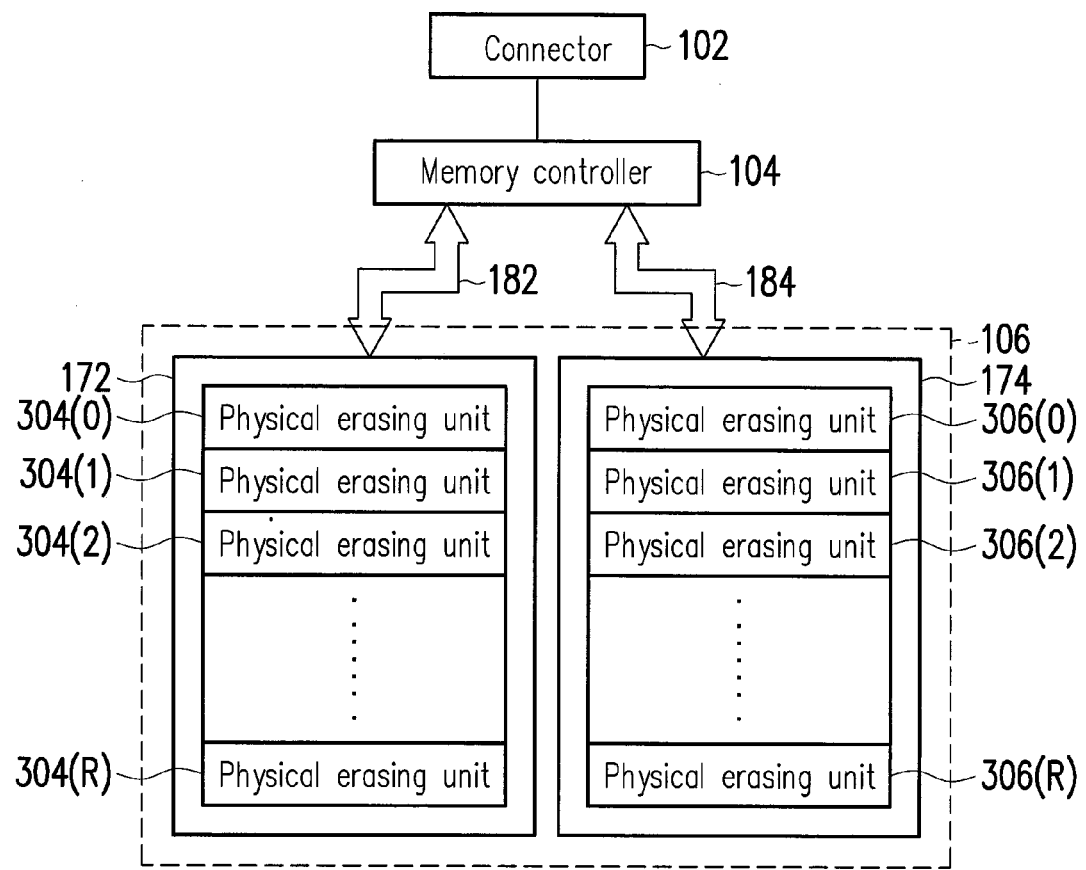
FIG. 4 is a schematic block diagram illustrating a flash memory storage apparatus according to the first exemplary embodiment.

FIG. 4 is a schematic block diagram illustrating a flash memory storage apparatus according to the first exemplary embodiment.

Referring to FIG. 4, the memory storage apparatus 100 includes a connector 102, a memory controller 104 and a rewritable non-volatile memory storage module 106.

In the present exemplary embodiment, the connector is compatible with a universal serial bus (USB) interface. However, the present invention is not limited thereto, and the connector 102 may also be compatible with a Parallel Advanced Technology Attachment (PATA) standard, an Institute of Electrical and Electronic Engineers (IEEE) 1394 standard, a peripheral component interconnect (PCI) Express interface standard, a Serial Advanced Technology Attachment (SATA) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards.

The memory controller 104 is configured to execute a plurality of logic gates or control commands which are implemented in a hardware form or in a firmware form, so as to perform operations of writing, reading or erasing data in the rewritable non-volatile memory storage module 106 according to the commands of the host 1000.

The rewritable non-volatile memory storage module 106 is coupled to the memory controller 104 and configured to store data written from the host system 1000. According to the present exemplary embodiment, the rewritable non-volatile memory module 106 includes a first memory part 172 and a second memory part 174, in which the first memory part 172 includes physical erasing units 304(0) to 304(R), and the second memory part 147 includes physical erasing units 306 (0) to 306(R). Each physical erasing unit has a plurality of physical programming units, and the physical programming units of the same physical erasing unit may be written separately and erased simultaneously. For example, each physical erasing unit is composed by 128 physical programming units. Nevertheless, it should be understood that the invention is not limited thereto. Each physical erasing unit may also be composed by 64 physical programming units, 256 physical programming units or any amount of the physical programming units.

More specifically, a plurality of memory parts can be included in one memory die, or each memory die is a memory part or a plurality of memory dies are a memory part. The physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundancy bit area. The data bit area having multiple physical access address is used to store user data, and the redundant bit area is used to store system data (for example, control information and error checking and correcting code). In the present exemplary embodiment, each data bit area of the physical programming unit contains 4 physical access addresses, and the size of each physical access address is 512 bytes. However, in other exemplary embodiments, more or less number of the physical address may be contained in the data bit area, amount and size of the physical access address are not limited in the invention. For example, in an exemplary embodiment, a memory part is a memory die, the physical erasing unit is a physical block, and the physical programming unit is a physical page or a physical sector, but the present invention is not limited thereto.

In the present exemplary embodiment, a rewritable non-volatile memory module 106 is a Multi Level Cell (MLC) NAND flash memory module which stores at least 2 bits of data in one cell. The rewritable non-volatile memory module 106 may also be a Single Level Cell (SLC) NAND flash memory module, a Trinary Level Cell (TLC) NAND flash memory module, other flash memory modules or any memory module having the same features.

It should be noted that, despite that in the present exemplary embodiment, it is described by using the rewritable non-volatile memory module 106 that includes two memory dies, but the invention is not limited thereto. In another exemplary embodiment, the rewritable non-volatile memory module 106 can include more memory dies.

In the present exemplary embodiment, the memory controller 104 transmits data to the first memory part 172 or receive data from the first memory part 172 separately through a first data input/output bus 182, and transmits data to the second memory part 174 or receive data from the second memory part 174 separately through a second data input/output bus 184. In particular, since the first memory part 172 and the second memory part 174 are coupled to the memory controller 104 respectively through independent data input/output buses, thus the memory controller 104 is capable of accessing the first memory part 172 and the second memory part 174 by using a parallel mode, so as to enhance access speed. For example, the memory controller 104 may, respectively through the first data input/output bus 182 and the second data input/output bus 184, transmit read commands simultaneously to the first memory part 172 and the second memory part 174, and receive data simultaneously from the first memory part 172 and the second memory part 174.

It should be noted that, despite that in the present exemplary embodiment, the first memory part 172 and the second memory part 174 are respectively coupled to the memory controller 104 through independent data input/output buses, but the present invention is not limited thereto. In another exemplary embodiment of the present invention, the first memory part 172 and the second memory part 174 may also be coupled to the memory controller 104 together through one data input/output bus. In particular, in case when the first memory part 172 and the second memory part 174 are coupled to the memory controller 104 together through one data input/output bus, the memory controller 104 is capable of accessing the first memory part 172 and the second memory part 174 by using a interleave mode, so as to enhance access speed. More specifically, a process for reading data from the physical programming units may be divided into two parts including data transferring and data reading. More specifically, when it is intended to read data from the physical programming units of the memory die, the memory controller 104 first issues a command to the memory die. Afterwards, the memory die performs data reading to place the data into a buffer area. After the memory die completes the data reading, the data is then transferred to the memory controller 104 from the buffer area. When reading data from the physical programming units, the memory die is in a busy state. Therefore, in case when the first memory part 172 and the second memory part 174 are coupled to the memory controller 104 together through one data input/output bus, while one memory die is performing data reading, the interleave mode may be used by the memory controller 104 to transfer the data from another memory die through the data input/output bus.

Figure 5:
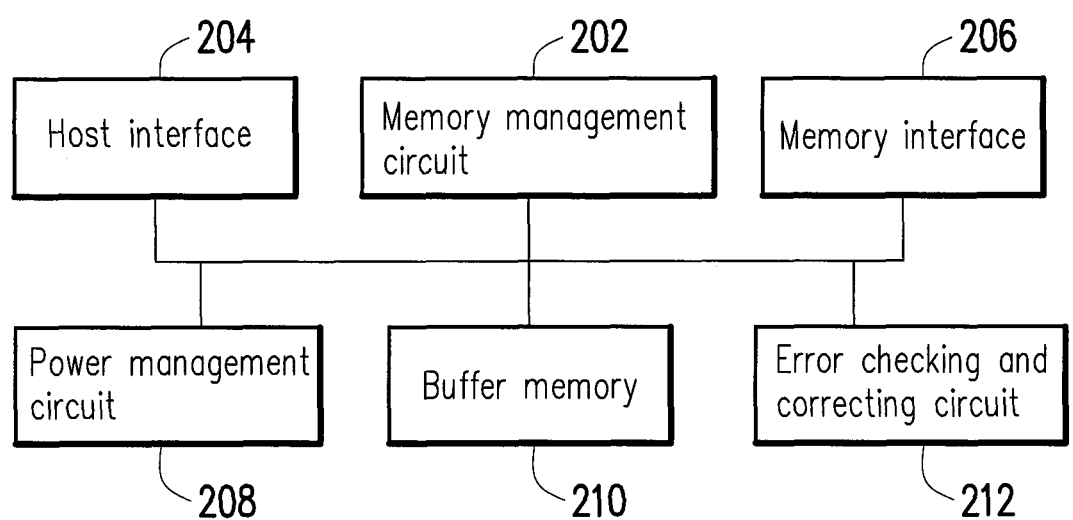
FIG. 5 is a schematic block diagram illustrating a memory controller according to the first exemplary embodiment.

FIG. 5 is a schematic block diagram illustrating a memory controller according to the first exemplary embodiment. It should be understood that, the structure of the memory controller as shown in FIG. 5 is only an example, and the present invention is not limited thereto.

Referring to FIG. 5, the memory controller 104 includes a memory management circuit 202, a host interface 204, a memory interface 206 and a power management circuit 208.

The memory management circuit 202 is configured to control the overall operations of the memory controller 104. Specifically, the memory management circuit 202 has a plurality of control commands. When the memory storage apparatus 100 is operated, the control commands are executed to perform various operations such as data writing, data reading and data erasing.

In the present exemplary embodiment, the control commands of the memory management circuit 202 are implemented in a form of a firmware. For example, the memory management circuit 202 has a microprocessor unit (not illustrated) and a ROM (not illustrated), and the control commands are burned into the ROM. When the memory storage apparatus 100 is operated, the control commands are executed by the microprocessor to perform operations of writing, reading or erasing data.

In another exemplary embodiment of the present invention, the control commands of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), a ROM (not illustrated) and a RAM (not illustrated). In particular, the ROM has a activate code, which is executed by the microprocessor unit to load the control commands stored in the rewritable non-volatile memory module 106 to the RAM of the memory management circuit 202 when the memory controller 104 is enabled. Next, the control commands are executed by the microprocessor unit to perform operations of writing, reading or erasing data.

Further, in another exemplary embodiment of the present invention, the control commands of the memory management circuit 202 may also be implemented in a form of hardware. For example, the memory management circuit 202 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured for managing the physical erasing unit of the rewritable non-volatile memory module 106; the memory writing circuit is configured for issuing a write command to the rewritable non-volatile memory module 106 in order to write data into the rewritable non-volatile memory module; the memory reading circuit is configured for issuing a read command to the rewritable non-volatile memory module 106 in order to read data from the rewritable non-volatile memory module 106; the memory erasing circuit is configured for issuing a erase command to the rewritable non-volatile memory module 106 in order to erase data from the rewritable non-volatile memory module 106; the data processing circuit is configured for processing both the data to be written into the rewritable non-volatile memory module 106 and the data to be read from the rewritable non-volatile memory module 106.

The host interface 204 is coupled to the memory management circuit 202 and configured for receiving and identifying commands and data sent from the host system 1000. Namely, the commands and data sent from the host system 1000 are passed to the memory management circuit 202 through the host interface 204. In the present exemplary embodiment, the host interface 204 is compatible with a USB standard. However, it should be understood that the invention is not limited thereto, and the host interface 204 may also be compatible with a PATA standard, an IEEE 1394 standard, a PCI Express standard, a SATA standard, a SD standard, a UHS-I standard, a UHS-II standard, a MS standard, a MMC standard, a eMMC standard, a UFS standard, a CF standard, an IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

The power management unit 208 is coupled to the memory management circuit 202 and configured to control the power of the memory storage apparatus 100. For example, the power management circuit 208 includes a phase lock loop (not illustrated) configured to generate a working clock for the memory controller 104 and the rewritable non-volatile memory module 106. In other words, the memory controller 104 and the rewritable non-volatile memory module 106 may be actuated according the working clock generated by the phase lock loop.

In an exemplary embodiment of the present invention, the memory controller 104 further includes a buffer memory 210 and an error checking and correcting circuit 212.

The buffer memory 210 is coupled to the memory management circuit 202 and configured to temporarily store data and commands from the host system 1000 or data from the rewritable non-volatile memory module 106.

The error checking and correcting circuit 212 is coupled to the memory management circuit 202 and configured to perform an error checking and correcting process to ensure the correctness of data. Specifically, when the memory management circuit 202 receives a write command from the host system 1000, the error checking and correcting circuit 212 generates an error checking and correcting code (ECC code) for data corresponding to the write command, and the memory management circuit 202 writes data and the ECC code corresponding to the write command to the rewritable non-volatile memory module 106. Next, when reading data from the rewritable non-volatile memory module 106, the memory management circuit 202 also reads the ECC Code corresponding to such data, and the error checking and correcting circuit 212 performs an error checking and correcting process on the read data based on the read ECC code.

Figure 6:
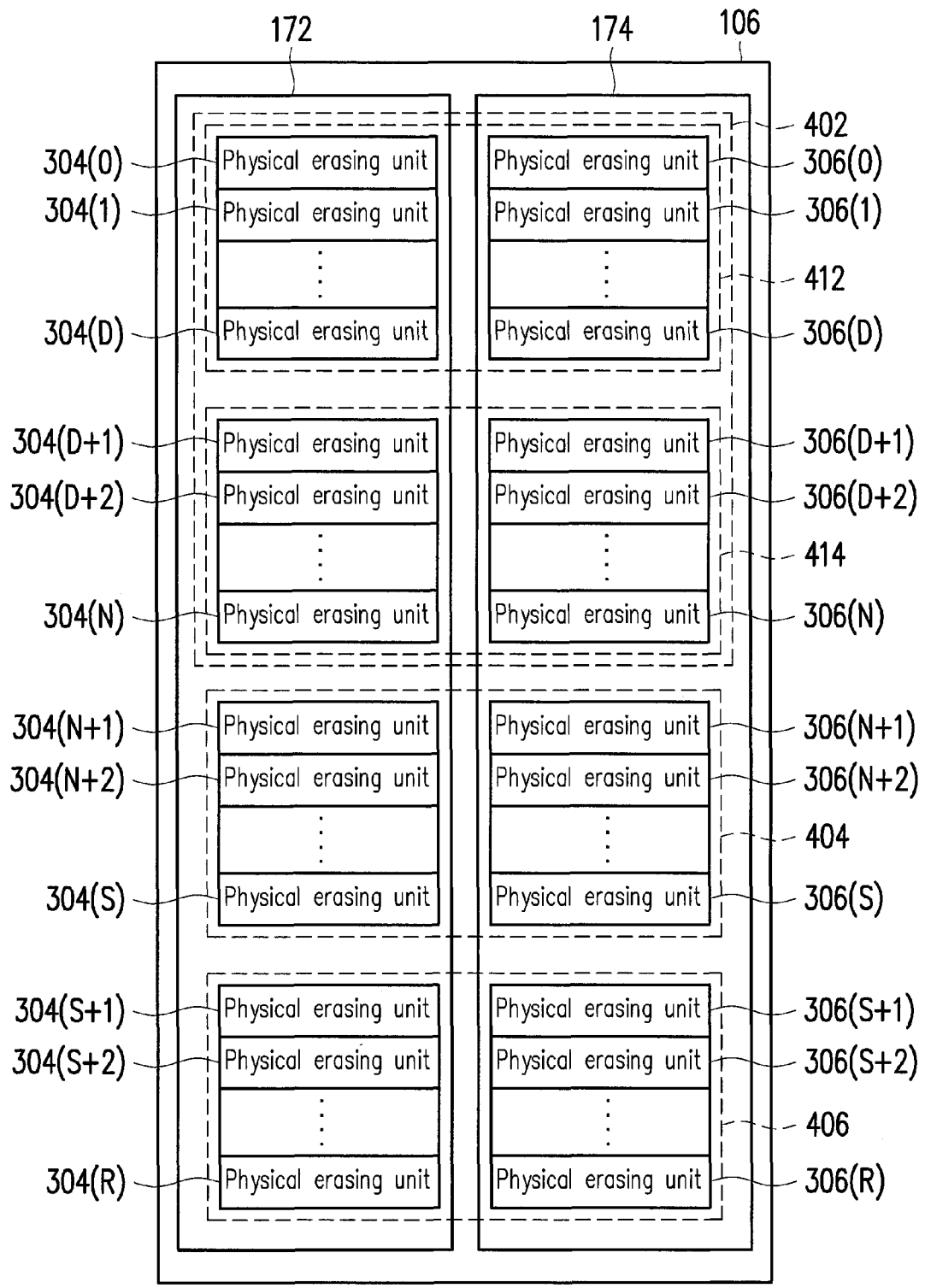
FIG. 6 is a schematic diagram of managing a memory storage apparatus according to an exemplary embodiment.

FIG. 6 is a schematic diagram of managing a memory storage apparatus according to an exemplary embodiment.

It should be understood that terms, such as "get", "select", "exchange", "group", "alternate" and so forth, are logical concepts which describe operations in the physical erasing units of the rewritable non-volatile memory module 106. That is, the physical erasing units of the rewritable non-volatile memory module are logically operated, but actual positions of the physical units of the rewritable non-volatile memory module are not changed.

Referring to FIG. 6, the memory controller 104 (or the memory management circuit 202) may logically group the physical erasing units 304(0) to 304(R) of the first memory part 172 and the physical erasing units 306(0) to 306(R) of the second memory part 174 into a storage area 402, a system area 404 and a replacement area 406.

Logically, the physical erasing units belonged to the storage area 402 is used for storing data written from the host system 1000. Namely, the memory controller 104 (or the memory management circuit 202) practically stores the data written from the host system 1000 by using the physical erasing units grouped as the storage area 402. More specifically, the memory controller 104 (or the memory management circuit 202) divides the storage area 402 into a data area 412 and a spare area 414, in which a physical erasing unit (also known as a data physical erasing unit) of the data area 412 is a physical erasing unit stored with data, and a physical erasing unit (also known as a spare physical erasing unit) of the spare area 414 is a physical erasing unit used for substituting the data area 412. Therefore, the physical erasing units of the spare area 414 are either blank or available physical erasing units (i.e., no data recorded or data marked as invalid). In other words, an erasing operation is performed to the physical erasing unit of the spare area, or an erasing operation is performed to the fetched physical erasing unit of the spare area 414 before the physical erasing unit being fetched for storing data. Therefore, the physical erasing units of the spare area 414 are available physical erasing units. More specifically, when one physical erasing unit is selected from the spare area 414 for storing valid data, such physical erasing unit is then associated to the data area 412. Also, the memory controller 104 (or the memory management circuit 202) may perform the erasing operation to all physical erasing units with data stored being invalid in the data area 412, and associate the physical erasing unit being erased to the spare area 414, so that said physical erasing unit may be alternately used for storing data written from the host system 1000.

The physical erasing units logically belonged to the system area 404 are used for recording system information, which includes information related to manufacturer and model of a memory chip, a number of physical erasing units in the memory chip, a number of the physical programming unit in each physical erasing unit, a firmware code for operating the memory storage apparatus 100, and so forth.

The physical erasing units logically belonged to the replacement area 406 are replacements to the physical erasing units. For example, 4% of the physical erasing units in the rewritable non-volatile memory module 106 are reserved for replacement during its manufacturing process. That is, when the physical erasing units in the data area 412, the spare area 414 and the system area 404 are damaged, the physical erasing units reserved in the replacement area 406 are used for replacing the damaged physical erasing units (i.e., bad physical erasing units). Thus, if available physical erasing units are present in the replacement area 406 while the physical erasing units being damaged, and the memory controller 104 may select an available physical erasing unit from the replacement area 406 to replace the damaged physical erasing unit. If no available physical erasing units are present in the replacement area 406 while the physical erasing unit being damaged, the memory storage apparatus 100 is announced by the memory controller 104 as being in a write protect status, and data cannot be written therein.

In particular, the amount of the physical erasing units in the storage area 402, the system area 404 and the replacement area 406 may be different according to the different memory specifications used. In addition, it should be understood that, during the operation of the memory storage apparatus 100, grouping relations of the physical erasing units related to the storage area 402, system area 404 and replacement area 406 may be dynamically changed. For example, when damaged physical erasing units in the storage area 402 are replaced by the physical erasing unit in the replacement area 406, the physical erasing unit originally from the replacement area 406 is then related to the storage area 402.

As described above, the physical erasing units of the data area 412 and the spare area 414 are used for storing the data written from the host system 1000. In the present exemplary embodiment, the memory controller 104 (or the memory management circuit 202) assigns logical addresses to the host system 1000 for data accessing.

Each logical address is composed by several sectors. In the present exemplary embodiment, each logical address is composed by four sectors. However, the present invention is not limited thereto. In another exemplary embodiment of the present invention, the logical address may be composed by 8 sectors or 16 sectors. For example, the memory controller 104 (or the memory management circuit 202) maintains a logical address-physical address mapping table to record a mapping relation between the logical addresses and the physical programming units. In other words, the physical programming units written with valid data are mapped to the corresponding logical addresses. Accordingly, when the host system 1000 accesses data in the sector, the memory controller 104 (or the memory management circuit 202) may first identify the logical address belonged to such sector and accesses data from the physical programming unit mapped with such logical address.

In the present exemplary embodiment, the firmware code for operating the memory storage apparatus 100 is stored into the physical erasing units in the system area 404, and when the memory storage apparatus 100 is powered on, the memory controller 104 (or the memory management circuit 202) loads the firmware code from the physical erasing units in the system area 404 into the buffer memory 210 for execution, so as to activate the memory storage apparatus 100.

In the present exemplary embodiment, two physical erasing units in the system area 404 are selected for storing the firmware code. In particular, the physical erasing units for storing the firmware code belong to different memory dies. More specifically, during a manufacturing process of the memory storage apparatus 100, the firmware code for operating the memory storage apparatus 100 is pre-stored into a formatting device or a peripheral storage device. During a formatting process or operating of the memory storage apparatus 100, a plurality of firmware codes are generated based on said pre-stored firmware code and written into different physical erasing units, memory parts or memory dies. In an exemplary embodiment, the memory storage apparatus 100 may only be stored with a plurality of firmware code copies or simultaneously stored with an original firmware code and a plurality of firmware code copies, and in the operation of loading the firmware code into the buffer memory 210, the original firmware code does not have to be read so as to ensure that the memory storage apparatus 100 is stored with a correct version of the firmware code. In another exemplary embodiment, at least parts of the original firmware code and the plurality of firmware code copies are read and loaded into the buffer memory 210. In another exemplary embodiment, when one firmware code copy has error bits which cannot be corrected, the memory storage apparatus 100 copies one firmware code copy again from the original firmware code copy or another firmware code copy, so as to replace the firmware code copy having error bits which cannot be corrected.

Figure 7:
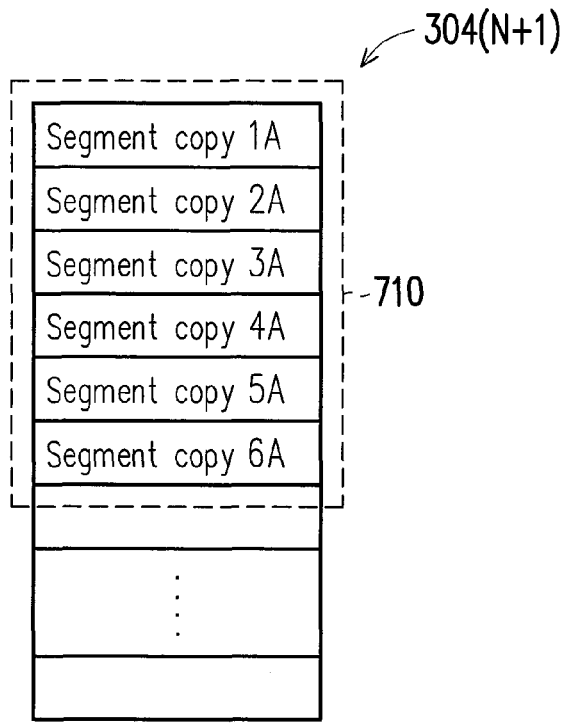
FIG. 7 and FIG. 8 are schematic diagrams of storing the firmware code copy of the firmware code into the memory storage apparatus according to the first exemplary embodiment.
Figure 8:
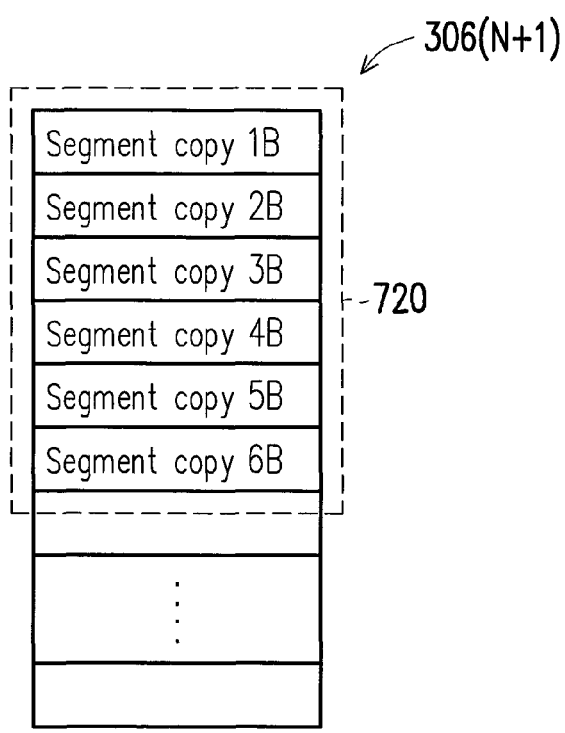

FIG. 7 and FIG. 8 are schematic diagrams of storing the firmware code copy of the firmware code into the memory storage apparatus according to the first exemplary embodiment. In order to facilitate illustration, it is assumed herein that it requires 6 physical programming units to store the firmware code.

Referring to FIG. 7 and FIG. 8, a first firmware code copy 710 is generated by copying a firmware code that controls overall operations of the memory storage apparatus 100, and a physical erasing units 304(N+1) in the system area 404 is used to store the first firmware code copy 710. Furthermore, a second firmware code copy 720 is generated by copying the firmware code that controls overall operations of the memory storage apparatus 100, and a physical erasing units 306(N+1) in the system area 404 are used to store the second firmware code copy 720.

In the present exemplary embodiment, the rewritable non-volatile memory module 106 is stored with two firmware code copies corresponding to the firmware code that controls overall operations of the memory storage apparatus 100. However, it should be understood that, in another exemplary embodiment of the present invention, the rewritable non-volatile memory module 106 is stored with even more firmware code copies corresponding to the firmware code that controls overall operations of the memory storage apparatus 100. In addition, despite that in the present exemplary embodiment, only one physical erasing unit is used to store one firmware code copy, but the present invention is not limited thereto, the number of the physical erasing units for storing the firmware code copy varies based on the size of the firmware code copy.

The first firmware code copy 710 includes 6 segments (i.e., a segment copy 1A to a segment copy 6A), and segment copies of the first firmware code copy 710 are identical to segments of the firmware code that controls overall operations of the memory storage apparatus 100. Similarly, the second firmware code copy 720 also includes 6 segments (i.e., a segment copy 1B to a segment copy 6B), and segment copies of the second firmware code copy are identical to segments of the firmware code that controls overall operations of the memory storage apparatus 100. In other words, the segment copy 1A to the segment copy 6A of the first firmware code copy are identical to the segment copy 1B to the segment copy 6B of the second firmware code copy, respectively.

In the present exemplary embodiment, the first firmware code copy 710 and the second firmware code copy 720 are respectively stored in the memory dies (i.e., the first memory part 172 and the second memory part 174) that is configured with independent data input/output buses. In particular, when the memory storage apparatus 100 is powered on, the memory controller (or the memory management circuit 202) obtains a storage address corresponding the first firmware code copy stored in a first memory part, obtains a storage address corresponding a second portion firmware code copy stored in a second memory part, and uses the parallel mode to load different portions of the firmware code copy from the first memory part 172 and the second memory part 174 respectively through the first data input/output bus 182 and the second data input/output bus 184, so as to reduce the time required for loading the firmware code.

FIG. 9 is a schematic diagram of loading the firmware code according to the first exemplary embodiment.

Referring to FIG. 9, first, the memory controller 104 (or the memory management circuit 202) loads the segment copy 1A from the physical erasing unit 304(N+1) of the first memory part 172 into the buffer memory 210 and simultaneously loads the segment copy 2B from the physical erasing unit 306(N+1) of the second memory part 174 into the buffer memory 210. Next, the memory controller 104 (or the memory management circuit 202) loads the segment copy 3A from the physical erasing unit 304(N+1) of the first memory part 172 into the buffer memory 210 and simultaneously loads the segment copy 4B from the physical erasing unit 306(N+1) of the second memory part 174 into the buffer memory 210. Lastly, the memory controller 104 (or the memory management circuit 202) loads the segment copy 5A from the physical erasing unit 304(N+1) of the first memory part 172 into the buffer memory 210 and simultaneously loads the segment copy 6B from the physical erasing unit 306(N+1) of the second memory part 174 into the buffer memory 210, at this stage, the loading of the firmware code is completed. In this example, the segment copies corresponding to the firmware code are sequentially loaded into the buffer memory 210. In other words, the segment copies loaded from the first memory part 172 (collectively referred to as the first portion firmware code copy) and the segment copies loaded from the second memory part 174 (collectively referred to as the second portion firmware code copy) are alternately arranged. In particular, the first memory part 172 and the second memory part 174 are coupled to the memory controller 104 respectively through the first data input/output bus 182 and the second data input/output bus 184. Accordingly, the memory controller 104 (or the memory management circuit 202) is capable of using the parallel mode to simultaneously issue the read commands to perform a synchronous reading. Based on above, the segment copy 1A and the segment copy 2B are synchronously loaded from the rewritable non-volatile memory module 106 into the buffer memory 210; the segment copy 3A and the segment copy 4B are synchronously loaded from the rewritable non-volatile memory module 106 into the buffer memory 210; and the segment copy 5A and the segment copy 6B are synchronously loaded from the rewritable non-volatile memory module 106 into the buffer memory 210, such that the speed of loading the firmware code can be significantly enhanced.

Figure 10:
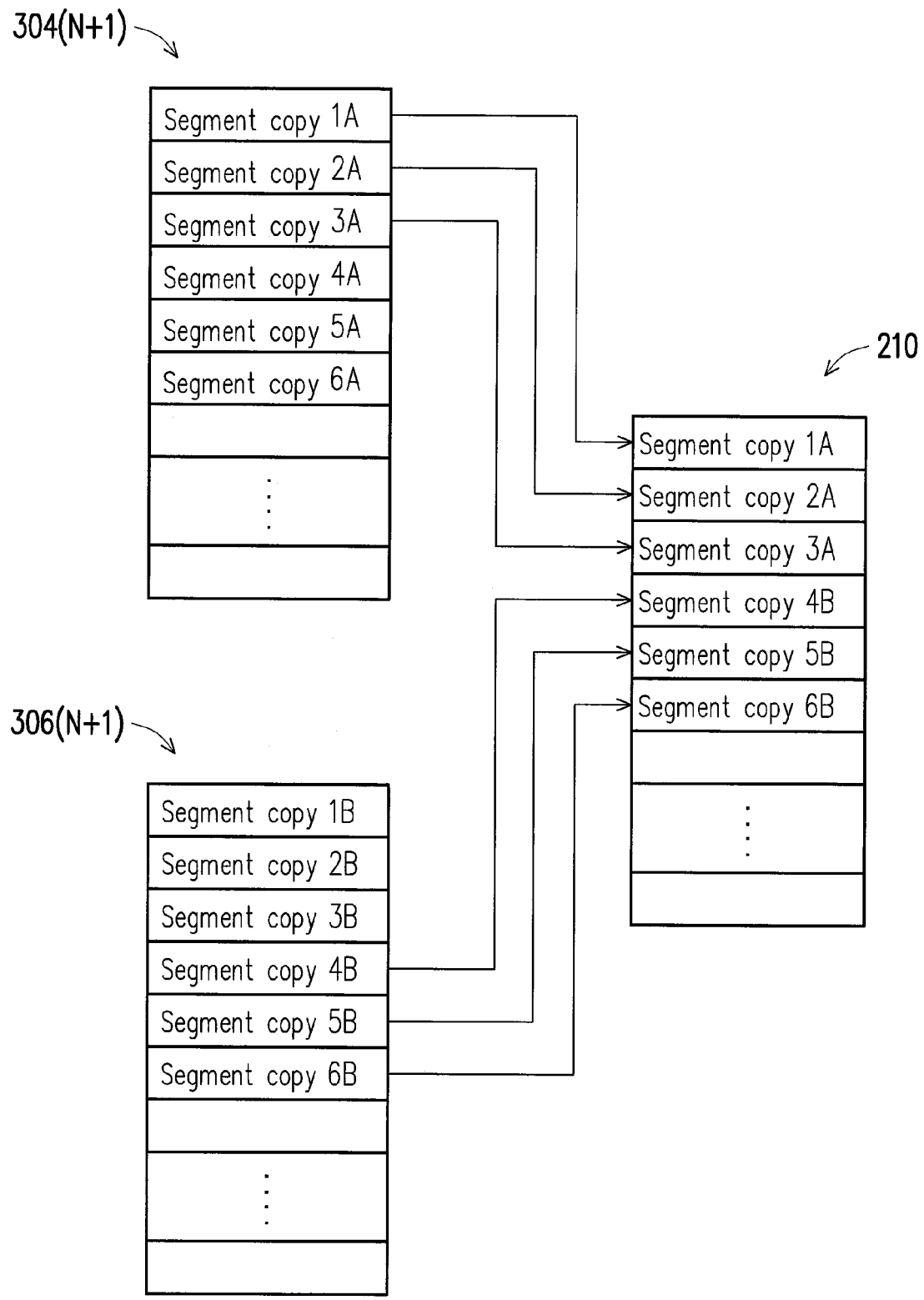
FIG. 10 is a schematic diagram of loading the firmware code according to another exemplary embodiment.

FIG. 10 is a schematic diagram of loading the firmware code according to another exemplary embodiment.

Referring to FIG. 10, first, the memory controller 104 (or the memory management circuit 202) loads the segment copy 1A from the physical erasing unit 304(N+1) of the first memory part 172 into the buffer memory 210 and simultaneously loads the segment copy 4B from the physical erasing unit 306(N+1) of the second memory part 174 into the buffer memory 210. Next, the memory controller 104 (or the memory management circuit 202) loads the segment copy 2A from the physical erasing unit 304(N+1) of the first memory part 172 into the buffer memory 210 and simultaneously loads the segment copy 5B from the physical erasing unit 306(N+1) of the second memory part 174 into the buffer memory 210. Lastly, the memory controller 104 (or the memory management circuit 202) loads the segment copy 3A from the physical erasing unit 304(N+1) of the first memory part 172 into the buffer memory 210 and simultaneously loads the segment copy 6B from the physical erasing unit 306(N+1) of the second memory part 174 into the buffer memory 210, at this stage, the loading of the firmware code is completed. In this example, the segments of the firmware code are grouped into a continuous first portion segments and a continuous second portion segments, in which the segment copies corresponding to the first portion segments are loaded from the first memory part 172 and the segment copies corresponding to the second portion segments are loaded from the second memory part 174. In other words, the segment copies loaded from the first memory part 172 (collectively referred to as the first portion firmware code copy) is continuous and the segment copies loaded from the second memory part 174 (collectively referred to as the second portion firmware code copy) is also continuous. In particular, in this example, since the segment copies read from the first memory part 172 are stored in continuous physical addresses and the segment copies read from the second memory part 174 are stored in continuous physical addresses, other than using the parallel mode for synchronous reading, the memory controller 104 (or the memory management circuit 202) may utilize a cache read command to further enhance the speed of reading.

Figure 11:
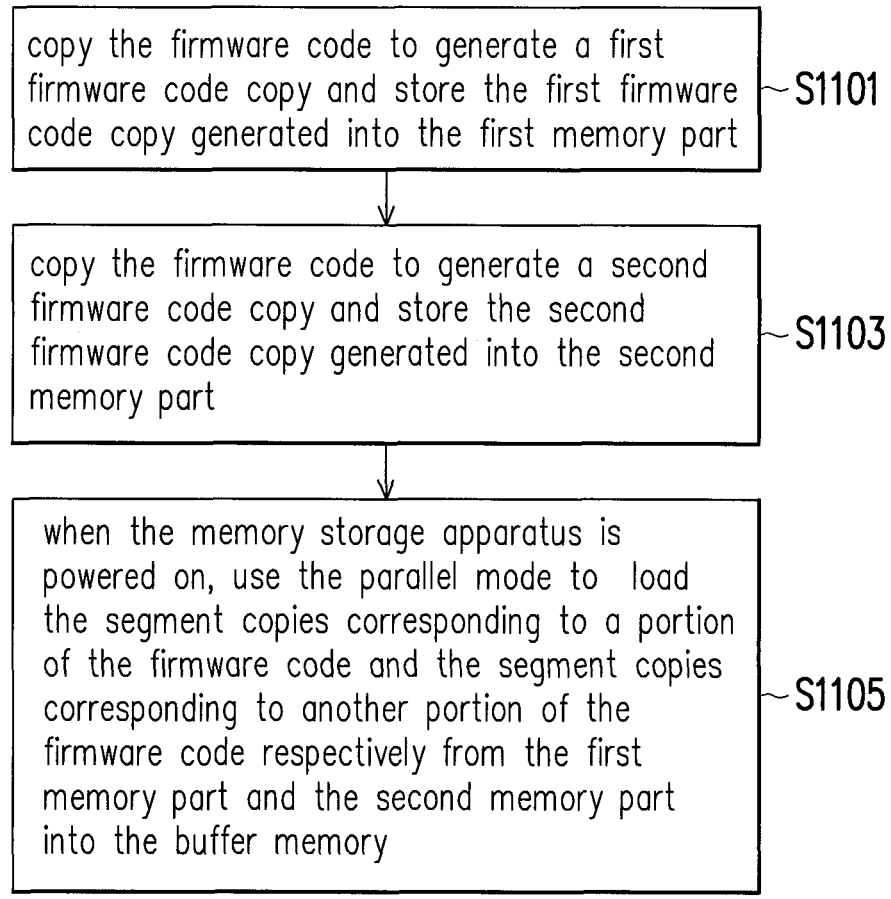
FIG. 11 is a flowchart illustrating the firmware code loading method according to the first exemplary embodiment.

FIG. 11 is a flowchart illustrating the firmware code loading method according to the first exemplary embodiment.

Referring to FIG. 11, in step S1101, a first firmware code copy 710 is generated by copying the firmware code, and the first firmware code copy 710 generated is stored into the first memory part 172.

In step S1103, a second firmware code copy 720 is generated by copying the firmware code, and the second firmware code copy 720 generated is stored into the second memory part 174.

In step S1105, when the memory storage apparatus 100 is powered on, the segment copies corresponding to a portion of the firmware code (i.e., the first portion firmware code copy) and the segment copies corresponding to another portion of the firmware code (i.e., the second portion firmware code copy) are loaded respectively from the first memory part 172 and the second memory part 174 into the buffer memory 210 by using the parallel mode. The method for loading the segment copies are described in detail as above with reference of FIG. 9 and FIG. 10, thus it is omitted hereinafter.

[Second Exemplary Embodiment]

The firmware code loading method according to the second exemplary embodiment also uses the parallel mode to load corresponding segments from a plurality of memory dies, its difference to the first exemplary embodiment is that, the first memory part and the second memory part are respectively stored with segment copies corresponding to a portion of the firmware code only. Hardware components of the first exemplary embodiment are used hereinafter to describe the second exemplary embodiment.

Figure 12:
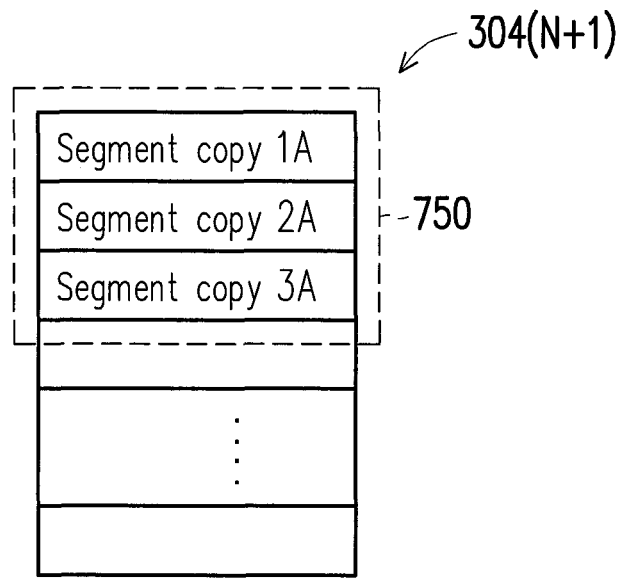
FIG. 12 and FIG. 13 are schematic diagrams of storing the firmware code copy of the firmware code into the memory storage apparatus according to a second exemplary embodiment.
Figure 13:
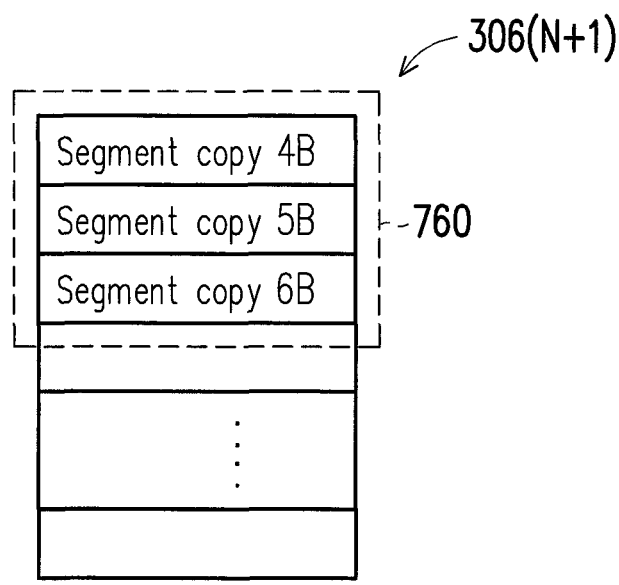

FIG. 12 and FIG. 13 are schematic diagrams of storing the firmware code copy of the firmware code into the memory storage apparatus according to a second exemplary embodiment. In order to facilitate illustration, it is assumed herein that it requires 6 physical programming units to store the firmware code.

Referring to FIG. 12 and FIG. 13, a first portion firmware code copy 750 is generated by copying a portion of a firmware code that controls overall operations of the memory storage apparatus 100, and a physical erasing units 304(N+1) in the system area 404 is used to store the first portion firmware code copy 750. Furthermore, a second portion firmware code copy 760 is generated by copying a portion of a firmware code that controls overall operations of the memory storage apparatus 100, and a physical erasing units 306(N+1) in the system area 404 is used to store the second portion firmware code copy 760.

Figure 14:
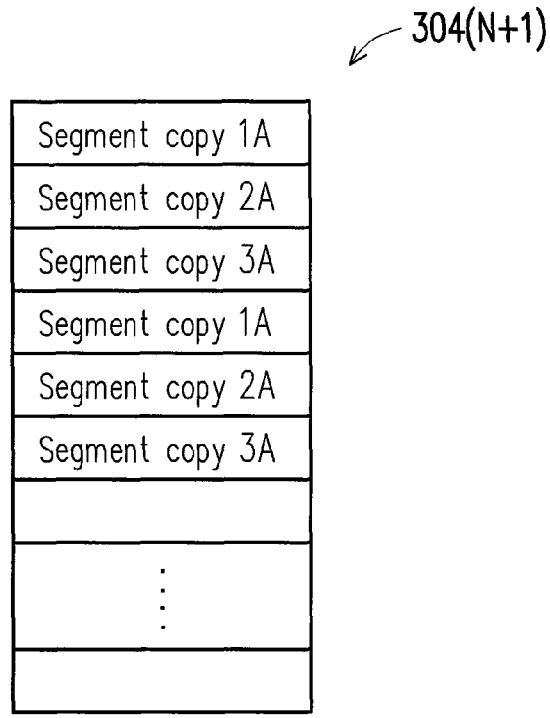
FIG. 14 and FIG. 15 are schematic diagrams of storing the firmware code copy of the firmware code into the memory storage apparatus according to another exemplary embodiment.
Figure 15:
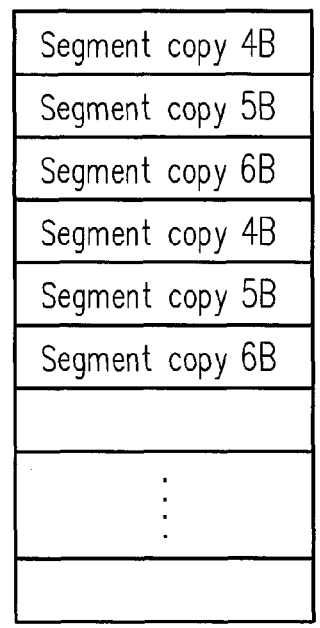

In the present exemplary embodiment, the rewritable non-volatile memory module 106 is merely stored with one copy of the first portion firmware code copy 750 and one copy of the second firmware code copy 760, but the present invention is not limited thereto. For example, in another exemplary embodiment, as shown in FIG. 14 and FIG. 15, the physical erasing unit 304(N+1) may store two copies of the first portion firmware code copies 720 and the physical erasing unit 306(N+1) may store two copies of the second portion firmware code copy 760, so as to avoid the firmware code loss from happening due to damages to the memory cells.

Similarly, in the present exemplary embodiment, when the memory storage apparatus 100 is powered on, the memory controller 104 (or the memory management circuit 120) may first scan the rewritable non-volatile memory module 106, so as to obtain a storage address corresponding the first portion firmware code copy 750 stored in a first memory part, and obtains a storage address corresponding a second portion firmware code copy 760 stored in a second memory part, said storage addresses may be stored into the buffer memory 210. When loading the firmware code, the memory controller 104 may use the parallel mode to load the first portion firmware code copy 750 and the second portion firmware code copy 760 respectively from the first memory part 172 and the second memory part 174 into the buffer memory 210.

Figure 16:
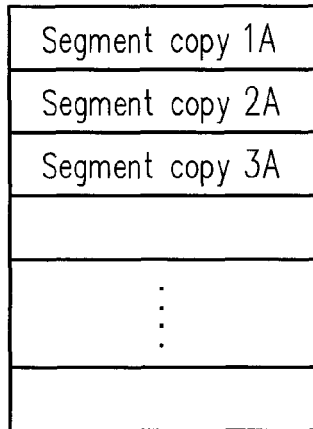
FIG. 16 is a schematic diagram of loading the firmware code according to the second exemplary embodiment.
Figure 16:
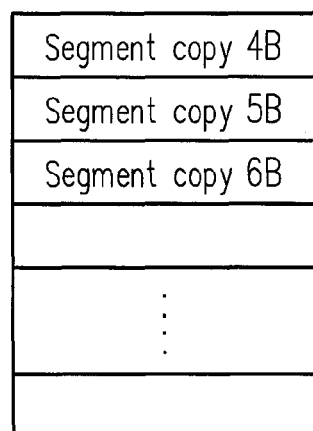
Figure 16:
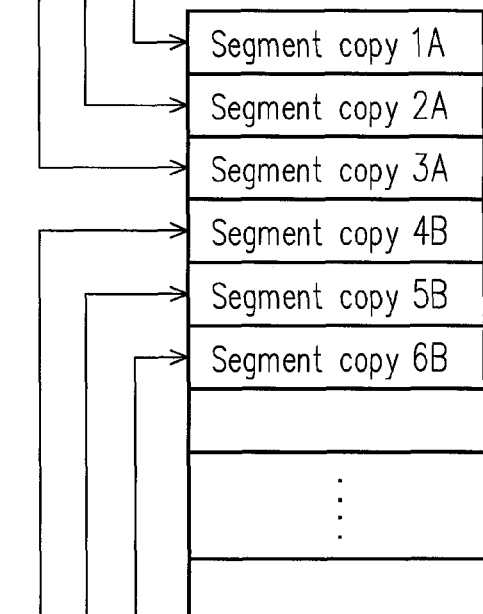

FIG. 16 is a schematic diagram of loading the firmware code according to the second exemplary embodiment.

Referring to FIG. 16, first, the memory controller 104 (or the memory management circuit 202) loads the segment copy 1A from the physical erasing unit 304(N+1) of the first memory part 172 into the buffer memory 210 and simultaneously loads the segment copy 4B from the physical erasing unit 306(N+1) of the second memory part 174 into the buffer memory 210. Next, the memory controller 104 (or the memory management circuit 202) loads the segment copy 2A from the physical erasing unit 304(N+1) of the first memory part 172 into the buffer memory 210 and simultaneously loads the segment copy 5B from the physical erasing unit 306(N+1) of the second memory part 174 into the buffer memory 210. Lastly, the memory controller 104 (or the memory management circuit 202) loads the segment copy 3A from the physical erasing unit 304(N+1) of the first memory part 172 into the buffer memory 210 and simultaneously loads the segment copy 6B from the physical erasing unit 306(N+1) of the second memory part 174 into the buffer memory 210, at this stage, the loading of the firmware code is completed. In other words, the segment copies of the first portion firmware code copy are loaded from the first memory part 172 and the segment copies of the second portion firmware code copy are loaded from the second memory part 174. In particular, the first memory part 172 and the second memory part 174 are coupled to the memory controller 104 respectively through the first data input/output bus 182 and the second data input/output bus 184. Accordingly, the memory controller 104 (or the memory management circuit 202) is capable of using the parallel mode to issue the cache read commands to perform a synchronous reading. Based on above, the segment copy 1A and the segment copy 2B are synchronously loaded from the rewritable non-volatile memory module 106 into the buffer memory 210; the segment copy 3A and the segment copy 4B are synchronously loaded from the rewritable non-volatile memory module 106 into the buffer memory 210; and the segment copy 5A and the segment copy 6B are synchronously loaded from the rewritable non-volatile memory module 106 into the buffer memory 210, such that the speed of loading the firmware code can be significantly enhanced.

Figure 17:
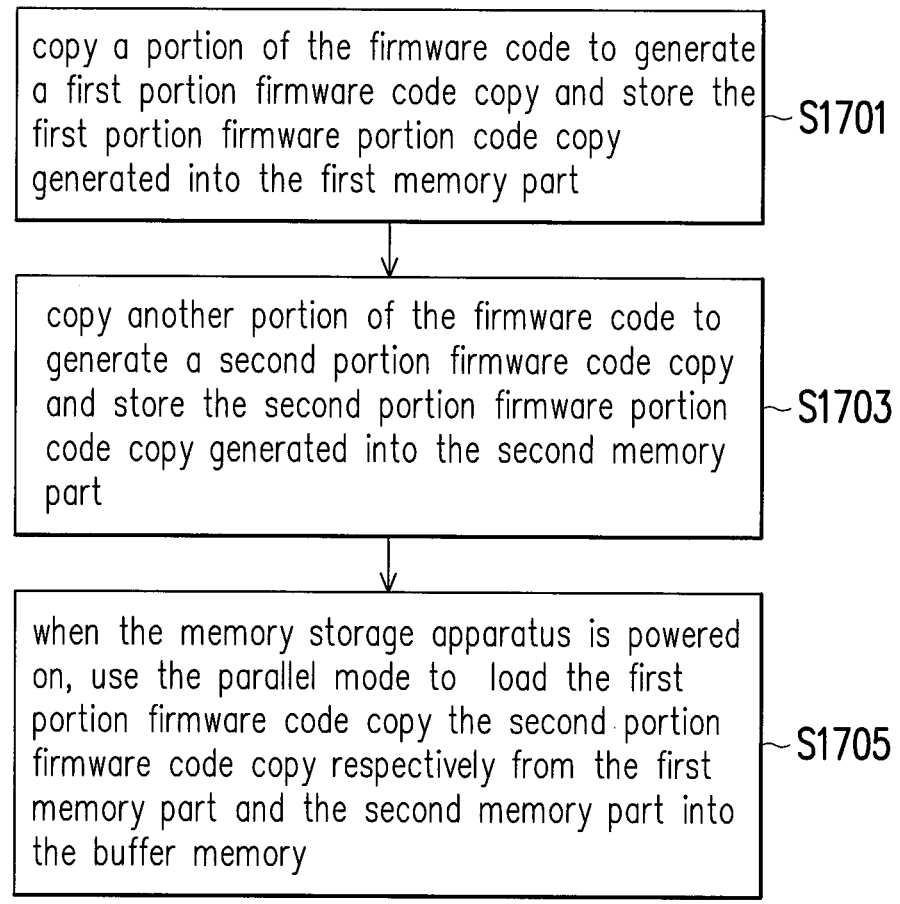
FIG. 17 is a flowchart illustrating the firmware code loading method according to the second exemplary embodiment.

FIG. 17 is a flowchart illustrating the firmware code loading method according to the second exemplary embodiment.

Referring to FIG. 17, in step S1701, a first portion firmware code copy 750 is generated by copying a portion of the firmware code, and the first portion firmware code copy 750 generated is stored into the first memory part 172.

In step S1703, a second portion firmware code copy 760 is generated by copying another portion of the firmware code, and the second portion firmware code copy 760 generated is stored into the second memory part 174.

In step S1705, when the memory storage apparatus 100 is powered on, the first portion firmware code copy 750 and the second portion firmware code copy 760 are loaded respectively from the first memory part 172 and the second memory part 174 into the buffer memory 210 by using the parallel mode. The method for loading the segment copies are described in detail as above with reference of FIG. 11, thus it is omitted hereinafter.

In view of above, in the firmware code loading mechanisms according to the above exemplary embodiments, the time required for loading the firmware code may be reduced by storing copies of a plurality of firmware codes or portions of the firmware code into a plurality of memory dies and utilizing a parallel reading. Accordingly, the firmware code loading method and the memory controller and the memory storage apparatus using the same as described in the exemplary embodiments may effectively enhance the speed of loading the firmware code. Especially, when the memory storage apparatus is implemented as a major hard drive of a computer, the firmware code loading method and the memory controller and the memory storage apparatus using the same as described in the exemplary embodiments may effectively reduce the time required for booting up. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A firmware code loading method for loading a firmware code from a rewritable non-volatile memory module of a memory storage apparatus, wherein the firmware code operates a memory storage apparatus and at least having a plurality of segments, the rewritable non-volatile memory module at least has a first memory part and a second memory part, and the firmware code loading method comprising:
   obtaining a storage address for storing a first portion firmware code copy corresponding to a first portion of the plurality of segments in the first memory part;
   obtaining a storage address for storing a second portion firmware code copy corresponding to a second portion of the plurality of segments in the second memory part; and
   using a parallel mode or a interleave mode to load the first portion firmware code copy and the second portion firmware code copy respectively from the first memory part and the second memory part into a buffer memory.

2. The firmware code loading method of claim 1, further comprising:
   storing the first portion firmware code copy corresponding to the first portion of the plurality of segments into the first memory part; and
   storing the second portion firmware code copy corresponding to the second portion of the plurality of segments into the second memory part.

3. The firmware code loading method of claim 2, wherein the step of storing the first portion firmware code copy corresponding to the first portion of the plurality of segments into the first memory part comprises: copying the firmware code entirely to generate a first firmware code copy and storing the first firmware code copy into the first memory part, wherein the first firmware code copy includes a plurality of segment copies identical to the plurality of segments, wherein the first firmware code copy includes the first portion firmware code copy,
   wherein the step of storing the second portion firmware code copy corresponding to the second portion of the plurality of segments into the second memory part comprises: copying the firmware code entirely to generate a second firmware code copy and storing the second firmware code copy into the second memory part, wherein the second firmware code copy includes a plurality of segment copies identical to the plurality of segments, wherein the second firmware code copy includes the second portion firmware code copy.

4. The firmware code loading method of claim 3, wherein the step of using the parallel mode or the interleave mode to load the first portion firmware code copy and the second portion firmware code copy respectively from the first memory part and the second memory part into the buffer memory comprises:
   reading a first segment copy among the plurality of segment copies of the first firmware code copy from a first physical programming unit of the first memory part and simultaneously reading a second segment copy among the plurality of segment copies of the second firmware code copy from a second physical programming unit of the second memory part,
   wherein the first segment copy is corresponding to a first segment among the plurality of segments of the firmware code, the second segment copy is corresponding to a second segment among the plurality of segments of the firmware code, and the second segment follows the first segment in the firmware code.

5. The firmware code loading method of claim 3, wherein the step of using the parallel mode or the interleave mode to load the first portion firmware code copy and the second portion firmware code copy respectively from the first memory part and the second memory part into the buffer memory comprises:
   reading one segment copy among the plurality of segment copies of the first portion firmware code copy from the first memory part and simultaneously reading one segment copy among the plurality of segment copies of the second portion firmware code copy from the second memory part,
   wherein the first portion of the plurality of segments of the firmware code is a plurality of continuous segments and the second portion of the plurality of segments of the firmware code is a plurality of continuous segments.

6. The firmware code loading method of claim 5, wherein the step of reading one segment copy among the plurality of segment copies of the first portion firmware code copy from the first memory part and simultaneously reading one segment copy among the plurality of segment copies of the second portion firmware code copy from the second memory part comprises:
   issuing a cache read command to read one segment copy among the plurality of segment copies of the first portion firmware code copy from the first memory part and simultaneously issuing the cache read command to read one segment copy among the plurality of segment copies of the second portion firmware code copy from the second memory part.

7. The firmware code loading method of claim 3, further comprising:

grouping physical erasing units of the first memory part and the second memory part logically into at least a data area, a spare area and system area, wherein the physical erasing units in the data area are configured to store a user data from a host system, the physical erasing units in the spare area are configured to replace the physical erasing units of the data area to store a updated user data, and the physical erasing units in the system area are configured to store a system data and cannot be accessed by the host system, wherein the step of storing the first firmware code copy to the first memory part comprises: storing the first firmware code copy into at least one of the physical erasing units belonging to both the first memory part and the system area, wherein the step of storing the second firmware code copy to the second memory part comprises: storing the second firmware code copy into at least one of the physical erasing units belonging to both the second memory part and the system area.

8. The firmware code loading method of claim 2, further comprising:
storing a third portion firmware code copy corresponding to the first portion of the plurality of segments into the first memory part, wherein the third portion firmware code copy is identical to the first portion firmware code copy; and
storing a fourth portion firmware code copy corresponding to the second portion of the plurality of segments into the second memory part, wherein the fourth portion firmware code copy is identical to the second portion firmware code copy.

9. A memory controller for loading a firmware code from a rewritable non-volatile memory module of a memory storage apparatus, the memory controller comprises:
a host interface configured to couple to a host system;
a memory interface configured to couple to the rewritable non-volatile memory module, wherein the rewritable non-volatile memory module at least includes a first memory part and a second memory part, the firmware code includes a plurality of segments, a first portion firmware code copy corresponding to a first portion of the plurality of segments is stored into the first memory part, and a second portion firmware code copy corresponding to a second portion of the plurality of segments is stored into the second memory part;
a buffer memory; and
a memory management circuit coupled to the host interface, the memory interface and the buffer memory, wherein the memory management circuit is configured to, when the memory storage apparatus is powered on, perform operations of: obtaining a storage address for storing the first portion firmware code copy corresponding to the first portion of the plurality of segments in the first memory part, obtaining a storage address for storing the second portion firmware code copy corresponding to the second portion of the plurality of segments in the second memory part, and using a parallel mode or a interleave mode to load the first portion firmware code copy and the second portion firmware code copy respectively from the first memory part and the second memory part into the buffer memory.

10. The memory controller of claim 9, wherein the firmware code is entirely copied to generate a first firmware code copy, the first firmware code copy is stored into the first memory part, and the first firmware code copy includes a plurality of segment copies identical to the plurality of segments, wherein the first firmware code copy includes the first portion firmware code copy, wherein the firmware code is entirely copied to generate a second firmware code copy, the second firmware code copy is stored into the second memory part, and the second firmware code copy includes a plurality of segment copies identical to the plurality of segments, wherein the second firmware code copy includes the second portion firmware code copy.

11. The memory controller of claim 10, wherein in the operation of using the parallel mode or the interleave mode to load the first portion firmware code copy and the second portion firmware code copy respectively from the first memory part and the second memory part into the buffer memory, the memory management circuit reads a first segment copy among the plurality of segment copies of the first firmware code copy from a first physical programming unit of the first memory part and simultaneously reads a second segment copy among the plurality of segment copies of the second firmware code copy from a second physical programming unit of the second memory part, wherein the first segment copy is corresponding to a first segment among the plurality of segments of the firmware code, the second segment copy is corresponding to a second segment among the plurality of segments of the firmware code, and the second segment follows the first segment in the firmware code.

12. The memory controller of claim 10, wherein in the operation of using the parallel mode or the interleave mode to load the first portion firmware code copy and the second portion firmware code copy respectively from the first memory part and the second memory part into the buffer memory, the memory management circuit reads one segment copy among the plurality of segment copies of the first portion firmware code copy from the first memory part and simultaneously reads one segment copy among the plurality of segment copies of the second portion firmware code copy from the second memory part, wherein the first portion of the plurality of segments of the firmware code is a plurality of continuous segments and the second portion of the plurality of segments of the firmware code is a plurality of continuous segments.

13. The memory controller of claim 12, wherein in the operation of reading one segment copy among the plurality of segment copies of the first portion firmware code copy from the first memory part and simultaneously reading one segment copy among the plurality of segment copies of the second portion firmware code copy from the second memory part, the memory management circuit issues a cache read command to read one segment copy among the plurality of segment copies of the first portion firmware code copy from the first memory part and simultaneously issues the cache read command to read one segment copy among the plurality of segment copies of the second portion firmware code copy from the second memory part.

14. The memory controller of claim 10, wherein the memory management circuit is further configured to group the first memory part and the second memory part logically into at least a data area, a spare area and a system area, wherein the physical erasing units in the data area are configured to store a user data from a host system, the physical erasing units in the spare area are configured to replace the physical erasing units of the data area to store a updated user data, and the physical erasing units in the system area are configured to store a system data and cannot be accessed by the host system, wherein the first firmware code copy is stored into at least one of the physical erasing units belonging to both the first memory part and the system area, wherein the second firmware code copy is stored into at least one of the physical erasing units belonging to both the second memory part and the system area.

15. The memory controller of claim 9, wherein a third portion firmware code copy corresponding to the first portion of the plurality of segments is stored into the first memory part, and the third portion firmware code copy is identical to the first portion firmware code copy, wherein a fourth portion firmware code copy corresponding to the second portion of the plurality of segments is stored into the second memory part, and the fourth portion firmware code copy is identical to the second portion firmware code copy.

16. A memory storage apparatus, comprising:
a connector configured to couple to a host system;
a rewritable non-volatile memory module at least including a first memory part and a second memory part; and
a memory controller having a buffer memory and coupled to the connector and the rewritable non-volatile memory,
wherein the memory controller is configured to load a firmware code from the rewritable non-volatile memory module into the buffer memory, wherein the firmware code includes a plurality of segments, a first portion firmware code copy corresponding to a first portion of the plurality of segments is stored into the first memory part, and a second portion firmware code copy corresponding to a second portion of the plurality of segments is stored into the second memory part,
wherein the memory controller is configured to, when the memory storage apparatus is powered on, perform operations of: obtaining a storage address for storing the first portion firmware code copy corresponding to the first portion of the plurality of segments in the first memory part, obtaining a storage address for storing the second portion firmware code copy corresponding to the second portion of the plurality of segments in the second memory part, and using a parallel mode or a interleave mode to load the first portion firmware code copy and the second portion firmware code copy respectively from the first memory part and the second memory part into the buffer memory.

17. The memory storage apparatus of claim 16, wherein the firmware code is entirely copied to generate a first firmware code copy, the first firmware code copy is stored into the first memory part, and the first firmware code copy includes a plurality of segment copies identical to the plurality of segments, wherein the first firmware code copy includes the first portion firmware code copy, wherein the firmware code is entirely copied to generate a second firmware code copy, the second firmware code copy is stored into the second memory part, and the second firmware code copy includes a plurality of segment copies identical to the plurality of segments, wherein the second firmware code copy includes the second portion firmware code copy.

18. The memory storage apparatus of claim 17, wherein in the operation of using the parallel mode or the interleave mode to load the first portion firmware code copy and the second portion firmware code copy respectively from the first memory part and the second memory part into the buffer memory, the memory controller reads a first segment copy among the plurality of segment copies of the first firmware code copy from a first physical programming unit of the first memory part and simultaneously reads a second segment copy among the plurality of segment copies of the second firmware code copy from a second physical programming unit of the second memory part, wherein the first segment copy is corresponding to a first segment among the plurality of segments of the firmware code, the second segment copy is corresponding to a second segment among the plurality of segments of the firmware code, and the second segment follows the first segment in the firmware code.

19. The memory storage apparatus of claim 17, wherein in the operation of using the parallel mode or the interleave mode to load the first portion firmware code copy and the second portion firmware code copy respectively from the first memory part and the second memory part into the buffer memory, the memory controller reads one segment copy among the plurality of segment copies of the first portion firmware code copy from the first memory part and simultaneously reads one segment copy among the plurality of segment copies of the second portion firmware code copy from the second memory part, wherein the first portion of the plurality of segments of the firmware code is a plurality of continuous segments and the second portion of the plurality of segments of the firmware code is a plurality of continuous segments.

20. The memory storage apparatus of claim 19, wherein in the operation of reading one segment copy among the plurality of segment copies of the first portion firmware code copy from the first memory part and simultaneously reading one segment copy among the plurality of segment copies of the second portion firmware code copy from the second memory part, the memory controller issues a cache read command to read one segment copy among the plurality of segment copies of the first portion firmware code copy from the first memory part and simultaneously issues the cache read command to read one segment copy among the plurality of segment copies of the second portion firmware code copy from the second memory part.

21. The memory storage apparatus of claim 17, wherein the memory controller is further configured to group the first memory part and the second memory part logically into at least a data area, a spare area and a system area, wherein the physical erasing units in the data area are configured to store a user data from a host system, the physical erasing units in the spare area are configured to replace the physical erasing units of the data area to store a updated user data, and the physical erasing units in the system area are configured to store a system data and cannot be accessed by the host system, wherein the first firmware code copy is stored into at least one of the physical erasing units belonging to both the first memory part and the system area, wherein the second firmware code copy is stored into at least one of the physical erasing units belonging to both the second memory part and the system area.

22. The memory storage apparatus of claim 16, wherein a third portion firmware code copy corresponding to the first portion of the plurality of segments is stored into the first memory part, and the third portion firmware code copy is identical to the first portion firmware code copy, wherein a fourth portion firmware code copy corresponding to the second portion of the plurality of segments is stored into the second memory part, and the fourth portion firmware code copy is identical to the second portion firmware code copy.

* * * * *